(12) United States Patent
Kamen et al.

(10) Patent No.: US 7,571,434 B1
(45) Date of Patent: Aug. 4, 2009

(54) METHOD AND APPARATUS FOR TRANSPARENT INVOCATION OF A CHARACTERISTICS EXTRACTOR FOR PATTERN-BASED SYSTEM DESIGN ANALYSIS

(75) Inventors: Yury Kamen, Menlo Park, CA (US); Deepak Alur, Fremont, CA (US); John P. Crupi, Bethesda, MD (US); Daniel B. Malks, Arlington, VA (US); Syed M. Ali, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 804 days.

(21) Appl. No.: 11/134,154

(22) Filed: May 20, 2005

(51) Int. Cl.
*G06F 9/45* (2006.01)
(52) U.S. Cl. .................... 717/154; 717/142; 717/143; 717/144; 717/146
(58) Field of Classification Search .................. None
See application file for complete search history.

(56) References Cited

U.S. PATENT DOCUMENTS

| | | | |
|---|---|---|---|
| 5,664,173 A | 9/1997 | Fast | |
| 5,752,245 A | 5/1998 | Parrish et al. | |
| 5,911,139 A | 6/1999 | Jain et al. | |
| 6,023,694 A | 2/2000 | Kouchi et al. | |
| 6,430,553 B1 | 8/2002 | Ferret | |
| 6,760,903 B1 * | 7/2004 | Morshed et al. | 717/130 |
| 7,137,100 B2 | 11/2006 | Iborra et al. | |
| 2003/0200280 A1 | 10/2003 | Austin | |
| 2004/0255291 A1 | 12/2004 | Sierer et al. | |
| 2006/0112175 A1 * | 5/2006 | Sellers et al. | 709/223 |
| 2006/0124738 A1 | 6/2006 | Wang et al. | |

FOREIGN PATENT DOCUMENTS

GB   2 383 152 A   6/2003

OTHER PUBLICATIONS

International Search Report dated Feb. 15, 2006 (3 pages).
Atkins, David L.; "Version Sensitive Editing: Change History as a Programming Tool"; System Configuration Management; ECOOP '98, SCM-9 Symposium, Proceedings 1998, Berlin, Germany; pp. 146-157, 1998 (12 pages).
PCT International Search Report dated Jan. 4, 2006 for PCT/US2005/018004 (4 pages).
PCT International Search Report dated Jan. 4, 2006 for PCT/US2005/018008 (4 pages).
PCT International Search Report dated Jan. 23, 2006 for PCT/US2005/018003 (4 pages).
Sartipi, K. et al.; "A Pattern Matching Framework for Software Architecture Recovery and Restructuring"; Proceedings IWPC'00; 8th International Workshop on Program Comprehension, Jun. 10, 2000, pp. 1-11 (11 pages).

(Continued)

*Primary Examiner*—Chuck O Kendall
(74) *Attorney, Agent, or Firm*—Osha • Liang LLP (57) ABSTRACT

A method for analyzing a target system that includes obtaining a plurality of characteristics from the target system using a characteristics extractor and at least one selected from the group consisting of a software build project associated with the target system and a modified software build project associated with the target system, wherein the plurality of characteristics is associated with a characteristics model, storing each of the plurality of characteristics in a characteristics store, and analyzing the target system by issuing at least one query to the characteristics store to obtain an analysis result.

20 Claims, 6 Drawing Sheets

OTHER PUBLICATIONS

Lange, C. et al.; "Comparing Graph-based Program Comprehension Tools to Relational Database-based Tools"; Program Comprehension, 2001; IWPC 2001 Proceedings; 9$^{th}$ International Workshop on May 12-13, 2001, Piscataway, NJ; IEEE 2001; pp. 209-218 (10 pages).

Sartipi, K. et al.; "A Graph Pattern Matching Approach to Software Architecture Recovery"; Proceedings IEEE International Conference on Software Maintenance; ICSM-2001, Florence, Italy, Nov. 7-9, 2001; pp. 408-419, (12 pages).

Jarzabek, S.; "Design of Flexible Static Program Analyzers with PQL"; IEEE Transactions on Software Engineering, IEEE Service Center, vol. 24, No. 3, Mar. 1, 1998; pp. 197-215 (19 pages).

Paul, S. et al.; "Source Code Retrieval Using Program Patterns"; Computer-Aided Software Engineering, 1992, Proceedings, Fifth International Workshop, Montreal, Quebec, Canada, Jul. 6-10, 1992; IEEE Computer Science, Jul. 6, 1992; pp. 92-105 (11 pages).

Masiero, P. et al.; "Legacy Systems Reengineering Using Software Patterns"; Computer Science Society, 1999, Proceedings SCCC '99; XIX International Conference of the Chilean Talca, Chile, Nov. 11-13, 1999; IEEE Computer Science; pp. 160-169 (10 pages).

Prof. Victor V. Martynov, EHU; "SEMPL Semantic Patterns Language"; Summary Chapter from the book "Foundations of Semantic Coding", pp. 128-138, EHU, 2001 (9 pages).

"Hammurapi Group"; pp. 1-7.

Kamran Sartipi; "Software Architecture Recovery Based on Pattern Matching"; School of Computer Science, Universitiy of Waterloo; Proceedings of the International Conference on Software Maintenance (ICSM'03); IEEE Computer Society (4 pages).

Aldrich, et al; "Architectural Reasoning in ArchJava"; Department of Computer Science and Engineering; University of Washington; 2002; pp. 1-34.

"Structural Analysis for Java"; Mar. 1, 2004 (2 pages).

Lovatt, et al.; "A Pattern Enforcing Compiler (PEC) for Java: Using the Compiler"; Department of Computing, Macquarie University; 2005 Australian Computer Society, Inc.; (10 pages).

Hallem, et al.; "Uprooting Software Defects at the Source"; Instant Messaging, vol. 1, No. 8, Nov. 2003; pp. 1-9.

"Fixing Software on the Assembly Line" An Overview of Coverity's Static Code Analysis Technology; (26 pages).

"CAST Application Intelligence Platform Empowering Application Management"; CAST The Application Intelligence Company; Oct. 2004 (2 pages).

Agitar Data Sheet; "Agitator & Management Dashboard"; Agitar Software 2003-2005; (4 pages).

Ellsworth et al; "JUnit+Jtest=Automated Test Case Design and Static Analysis"; (3 pages).

Carriere et al.; "Assessing Design Quality From a Software Architectural Perspective"; OPPSLA '97 Workshop on Object-Oriented Design Quality; Oct. 5, 1997 (4 pages).

"J2EE Code Validation Preview for WebSphere Studio"; (2 pages).

"SQL Compiler (for Java)"; (8 pages).

Hassan et al.; "Architecture Recovery of Web Applications"; The Guide to Computing Literature; International Conference on Software Engineering; 2002; (12 pages).

International Preliminary Report dated Dec. 6, 2007 (8 pages).

International Preliminary Report dated Dec. 6, 2007 (7 pages).

* cited by examiner

METHOD AND APPARATUS FOR TRANSPARENT INVOCATION OF A CHARACTERISTICS EXTRACTOR FOR PATTERN-BASED SYSTEM DESIGN ANALYSIS

CROSS-REFERENCE TO RELATED APPLICATIONS

The present application contains subject matter that may be related to the subject matter in the following U.S. applications filed on May 20, 2005, and assigned to the assignee of the present application: "Method and Apparatus for Tracking Changes in a System" Ser. No. 11/133,831; "Method and Apparatus for Generating Components for Pattern-Based System Design Analysis Using a Characteristics Model" Ser. No. 11/133,717; "Method and Apparatus for Pattern-Based System Design Analysis" Ser. No. 11/134,062; "Method and Apparatus for Cross-Domain Querying in Pattern-Based System Design Analysis" Ser. No. 11/133,507; "Method and Apparatus for Pattern-Based System Design Analysis Using a Meta Model" Ser. No. 11/134,021; "Pattern Query Language" Ser. No. 11/133,660; and "Method and Apparatus for Generating a Characteristics Model for Pattern-Based System Design Analysis Using a Schema" Ser. No. 11/133,714.

BACKGROUND

As software technology has evolved, new programming languages and increased programming language functionality has been provided. The resulting software developed using this evolving software technology has become more complex. The ability to manage the quality of software applications (including design quality and architecture quality) is becoming increasingly more difficult as a direct result of the increasingly complex software. In an effort to manage the quality of software applications, several software development tools and approaches are now available to aid software developers in managing software application quality. The following is a summary of some of the types of quality management tools currently available.

One common type of quality management tool is used to analyze the source code of the software application to identify errors (or potential errors) in the source code. This type of quality management tool typically includes functionality to parse the source code written in a specific programming language (e.g., Java™, C++, etc.) to determine whether the source code satisfies one or more coding rules (i.e., rules that define how source code in the particular language should be written). Some quality management tools of the aforementioned type have been augmented to also identify various coding constructs that may result in security or reliability issues. While the aforementioned type of quality management tools corrects coding errors, it does not provide the software developer with any functionality to verify the quality of the architecture of software application.

Other quality management tools of the aforementioned type have been augmented to verify that software patterns have been properly implemented. Specifically, some quality management tools of the aforementioned type have been augmented to allow the software developer to indicate, in the source code, the type of software pattern the developer is using. Then the quality management tool verifies, during compile time, that the software pattern was used/implemented correctly.

In another implementation of the aforementioned type of quality management tools, the source code of the software is parsed and the components (e.g., classes, interfaces, etc.) extracted from the parsing are subsequently combined in a relational graph (i.e., a graph linking all (or sub-sets) of the components). In a subsequent step, the software developer generates an architectural design, and then compares the architectural design to the relational graph to determine whether the software application conforms to the architectural pattern. While the aforementioned type of quality management tool enables the software developer to view the relationships present in the software application, it does not provide the software developer with any functionality to conduct independent analysis on the extracted components.

Another common type of quality management tool includes functionality to extract facts (i.e., relationships between components (classes, interfaces, etc.) in the software) and subsequently displays the extracted facts to the software developer. While the aforementioned type of quality management tool enables the software developer to view the relationships present in the software application, it does not provide the developer with any functionality to independently query the facts or any functionality to extract information other than facts from the software application.

Another common type of quality management tool includes functionality to extract and display various statistics (e.g., number of lines of code, new artifacts added, software packages present, etc.) of the software application to the software developer. While the aforementioned type of quality management tool enables the software developer to view the current state of the software application, it does not provide the developer with any functionality to verify the quality of the architecture of the software application.

SUMMARY

In general, in one aspect, the invention relates to a method for analyzing a target system, comprising obtaining a plurality of characteristics from the target system using a characteristics extractor and at least one selected from the group consisting of a software build project associated with the target system and a modified software build project associated with the target system, wherein the plurality of characteristics is associated with a characteristics model, storing each of the plurality of characteristics in a characteristics store, and analyzing the target system by issuing at least one query to the characteristics store to obtain an analysis result.

In general, in one aspect, the invention relates to a system, comprising a characteristics model defining at least one artifact and a plurality of characteristics associated with the at least one artifact, a target system comprising at least one of the plurality of characteristics defined in the characteristics model, at least one characteristics extractor configured to obtain at least one of the plurality of characteristics from the target system, a characteristics store configured to store the at least one of the plurality of characteristics obtained from the target system, and a query engine configured to analyze the target system by issuing at least one query to the characteristics store and configured to obtain an analysis result in response to the at least one query.

In general, in one aspect, the invention relates to a computer readable medium comprising software instructions for analyzing a target system, comprising software instructions to obtain a characteristics model, generate a characteristics extractor associated with the characteristics model, and generate a characteristics store API associated with the characteristics model, wherein the characteristics extractor uses the characteristics store application programming interface (API) to store each of the plurality of characteristics in the characteristics store, obtain a plurality of characteristics from the target system using a characteristics extractor, wherein the plurality of characteristics is associated with a characteristics model, store each of the plurality of characteristics in a characteristics store using the characteristics store API, and analyze the target system by issuing at least one query to the characteristics store to obtain an analysis result.

Other aspects of the invention will be apparent from the following description and the appended claims.

DETAILED DESCRIPTION

Exemplary embodiments of the invention will be described with reference to the accompanying drawings. Like items in the drawings are shown with the same reference numbers.

In the exemplary embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for pattern-based system design analysis. More specifically, embodiments of the invention provide a method and apparatus for using one or more characteristics models, one or more characteristics extractors, and a query engine configured to query the characteristics of a target system to analyze the system design. Embodiments of the invention provide the software developer with a fully configurable architectural quality management tool that enables the software developer to extract information about the characteristics of the various artifacts in the target system, and then issue queries to determine specific details about the various artifacts including, but not limited to, information such as: number of artifacts of the specific type present in the target system, relationships between the various artifacts in the target system, the interaction of the various artifacts within the target system, the patterns that are used within the target system, etc.

In addition, embodiments of the invention provide a method and apparatus for transparent invocation of a characteristics extractor(s). More specifically, embodiments of the invention leverage the information within a software build project associated with the target system to obtain characteristics from the target system. In one embodiment of the invention, the software build project includes information about the location of source code associated with the target system, information about the location libraries referenced by the source code, information about the location of resulting code/files (e.g., byte code, object code, archive files, etc.) generated when the software build project is executed, etc. Thus, the characteristics extractor(s) uses the aforementioned information contained in the software build project to determine where in the system to extract information about the target system.

Figure 1:
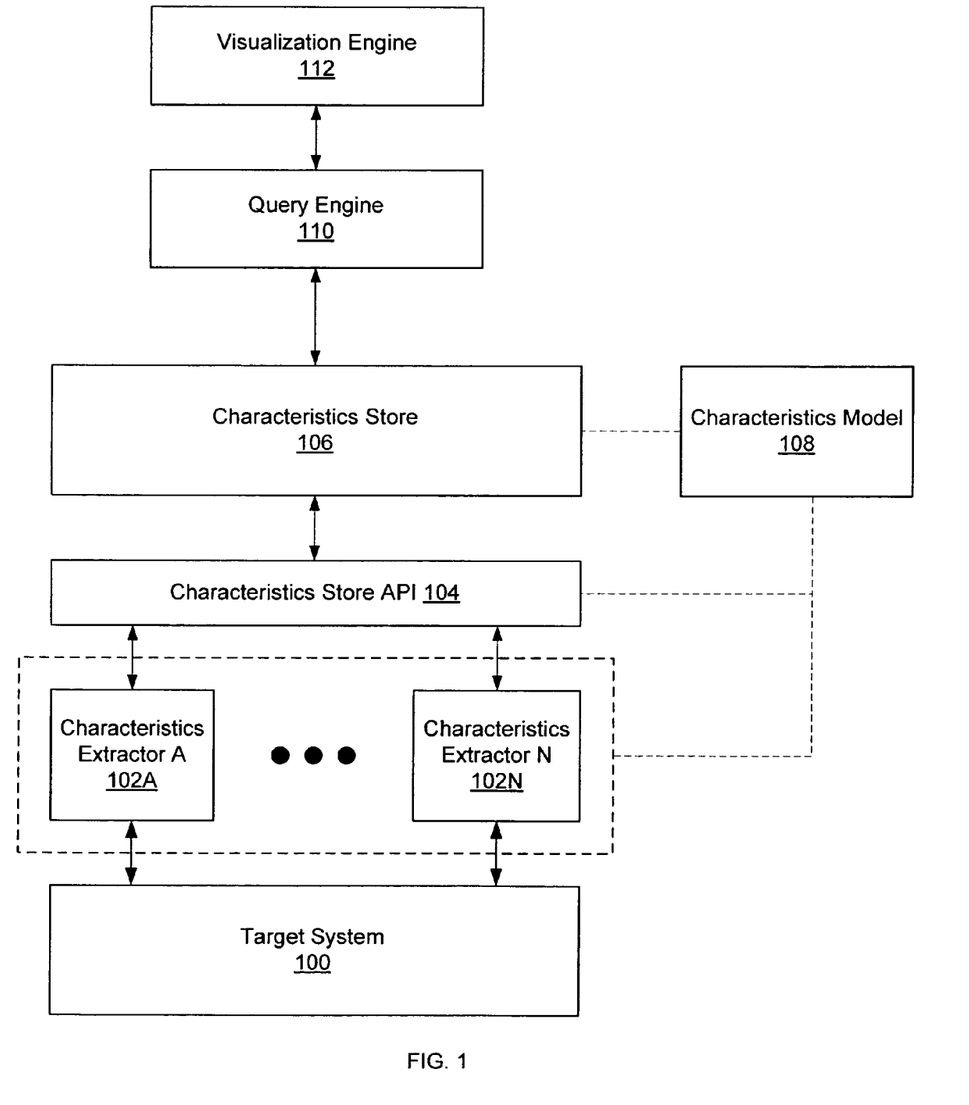
FIG. 1 shows a system in accordance with one embodiment of the invention.

FIG. 1 shows a system in accordance with one embodiment of the invention. The system includes a target system (100) (i.e., the system that is to be analyzed) and a number of components used in the analysis of the target system. In one embodiment of the invention, the target system (100) may correspond to a system that includes software, hardware, or a combination of software and hardware. More specifically, embodiments of the invention enable a user to analyze specific portions of a system or the entire system. Further, embodiments of the invention enable a user to analyze the target system with respect to a specific domain (discussed below). Accordingly, the target system (100) may correspond to any system under analysis, where the system may correspond to the entire system including software and hardware, or only a portion of the system (e.g., only the hardware portion, only the software portion, a sub-set of the hardware or software portion, or any combination thereof).

In one embodiment of the invention, if the target system (100) is a software application, then the target system (100) is associated with a software build project. Said another way, the target system (100) is created using a software build project (i.e., created by executing the software build project). A software build project corresponds to a file that includes information about how to generate the target system (100) from the source code and associated libraries. In the software context, libraries refer to a collection of subprograms used to develop software. Libraries are distinguished from executables (e.g., byte code, object code, etc.) in that they are not independent programs; rather, they are "helper" code that provides services to some other independent program (i.e., software applications include references to specific libraries to perform certain functions). Thus, while simple software applications may be easily compiled from the source code without requiring references to libraries, etc., the compilation of complex software applications typically requires detailed knowledge about the compilation process. This detailed knowledge is typically included in the software build project used to create the target system (100).

The following lists some examples of information that may be included in the software build project: information about the location of the source code, information about the location of the libraries referenced in the source code, information about the dependencies between portions of the source code (typically seen in cases where the source code is not in a single file), information about where the code resulting from executing the software build project will be stored, etc. In addition, the software build project may include specific calls to language specific compilers (e.g., javac) as well as invoke other functions such as, but not limited to, mkdir, copy, delete, zip (or other compression functions to package code resulting from the execution of the software build project), etc. In one embodiment of the invention, the software build project for the target system (100) may be modified to invoke one or more characteristics extractors (discussed below). Examples of commercially available software build project tools are "ant" and "make."

Once the software build project has been created (and all the files containing the source code and libraries referenced by the source code are available), then the software build project may be executed to generate the target system (100) (e.g., a software application). Execution of the software build project typically includes performing the actions specified in the software build project (e.g., invoking the compiler to compile specific portions of source code, creating directories to store the code resulting from compilation of the source code, etc.).

Continuing with the discussion of FIG. 1, the system includes the following components to aid in the analysis of the target system: one or more characteristics extractors (e.g., characteristics extractor A (102A), characteristics extractor N (102N)), a characteristics store application programming interface (API) (104), a characteristics store (106), a characteristics model (108), a query engine (110), and visualization engine (112). Each of these components is described below.

Figure 2:
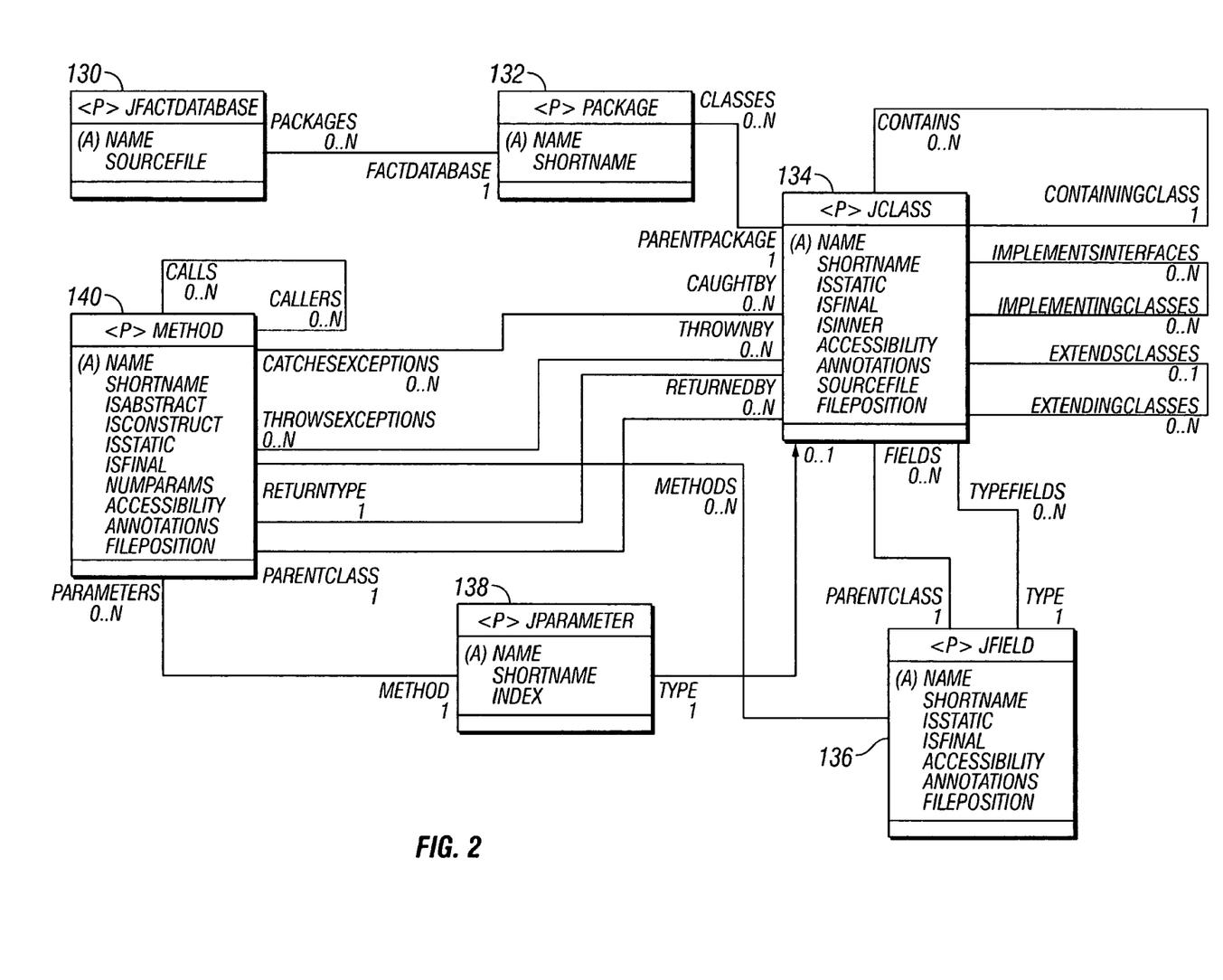
FIG. 2 shows a characteristics model in accordance one embodiment of the invention.

In one embodiment of the system, the characteristics model (108) describes artifacts (i.e., discrete components) in a particular domain. In one embodiment of the invention, the domain corresponds to any grouping of "related artifacts" (i.e., there is a relationship between the artifacts). Examples of domains include, but are not limited to, a Java™ 2 Enterprise Edition (J2EE) domain (which includes artifacts such as servlets, filters, welcome file, error page, etc.), a networking domain (which includes artifacts such as web server, domain name server, network interface cards, etc), and a DTrace domain (described below). In one embodiment of the invention, each characteristics model includes one or more artifacts, one or more relationships describing the interaction between the various artifacts, and one or more characteristics that describe various features of the artifact. An example of a characteristics model (108) is shown in FIG. 2. Those skilled in the art will appreciate that the system may include more than one characteristics model (108).

In one embodiment of the invention, the use of a characteristics model (108) enables a user to analyze the target system (100) with respect to a specific domain. Further, the use of multiple characteristics models allows the user to analyze the target system (100) across multiple domains. In addition, the use of multiple characteristics models allows the user to analyze the interaction between various domains on the target system (100).

In one embodiment of the invention, the characteristics extractors (e.g., characteristics extractor A (102A), characteristics extractor N (102N)) are used to obtain information about various artifacts (i.e., characteristics) defined in the characteristics model (108). In one embodiment of the invention, the characteristics extractors (characteristics extractor A (102A), characteristics extractor B (102N)) are generated manually using the characteristics model (108).

In one embodiment of the invention, the characteristics extractor (e.g., characteristics extractor A (102A), characteristics extractor B (102N)) corresponds to an agent loaded on the target system (100) that is configured to monitor and obtain information about the artifacts in the target system (100). Alternatively, the characteristics extractor (e.g., characteristics extractor A (102A), characteristics extractor B (102N)) may correspond to an interface that allows a user to manually input information about one or more artifacts in the target system (100). In another embodiment of the invention, the characteristics extractor (e.g., characteristics extractor A (102A), characteristics extractor B (102N)) may correspond to a process (or system) configured to obtain information about one or more artifacts in the target system (100) by monitoring network traffic received by and sent from the target system (100). In another embodiment of the invention, the characteristics extractor (e.g., characteristics extractor A (102A), characteristics extractor B (102N)) may correspond to a process (or system) configured to obtain information about one or more artifacts in the target system (100) by sending requests (e.g., pinging, etc.) for specific pieces of information about artifacts in the target system (100) to the target system (100), or alternatively, sending requests to the target system and then extracting information about the artifacts from the responses received from target system (100).

Further, in one embodiment of the invention, if the target system (100) corresponds to source code and the characteristics model (108A, 108N) corresponds to a formal specification of a programming language (e.g., Java™), then the characteristics extractor (e.g., characteristics extractor A (102A), characteristics extractor N (102N)) may correspond to a process that is configured to parse the source code and temporarily store the artifacts and characteristics obtained from parsing the source code in an in-memory object graph.

Those skilled in the art will appreciate that each characteristics extractor (or set of characteristics extractors) is associated with a particular characteristics model (108). Thus, each characteristics extractor typically only retrieves information about artifacts described in the characteristics model with which the characteristics extractor is associated. Furthermore, if there are multiple characteristics models in the system, then each characteristics model may be associated with one or more characteristics extractors.

The information about the various artifacts in the target system (100) obtained by the aforementioned characteristics extractors (e.g., characteristics extractor A (102A), characteristics extractor N (102N)) is stored in the characteristics store (106) via the characteristic store API (104). In one embodiment of the invention, characteristics store API (104) provides an interface between the various characteristics extractors (characteristics extractor A (102A), characteristics extractor N (102N)) and the characteristics store (106). Further, the characteristics store API (104) includes information about where in the characteristics store (106) each characteristic obtained from the target system (100) should be stored.

In one embodiment of the invention, the characteristics store (106) corresponds to any storage that includes functionality to store characteristics in a manner that allows the characteristics to be queried. In one embodiment of the invention, the characteristics store (106) may correspond to a persistent storage device (e.g., hard disk, etc). In one embodiment of the invention, the characteristics store (106) corresponds to a relational database that may be queried using a query language such as Structure Query Language (SQL). Those skilled in the art will appreciate that any query language may be used. In one embodiment of the invention, if the characteristics store (106) is a relational database, then the characteristics store (106) includes a schema associated with the characteristics model (108) that is used to store the characteristics associated with the particular characteristics model (108). Those skilled in the art will appreciate that, if there are multiple characteristics models, then each characteristics model (108) may be associated with a separate schema.

In one embodiment of the invention, if the characteristics store (106) is a relational database that includes a schema associated with the characteristics model (108), then the characteristics store API (104) includes the necessary information to place characteristics obtained from target system (100) in the appropriate location in the characteristics store (106) using the schema.

In one embodiment of the invention, the query engine (110) is configured to issue queries to the characteristics store (106). In one embodiment of the invention, the queries issued by the query engine (110) enable a user (e.g., a system developer, etc.) to analyze the target system (100). In particular, in one embodiment of the invention, the query engine (110) is configured to enable the user to analyze the presence of specific patterns in the target system as well as the interaction between various patterns in the target system.

In one embodiment of the invention, a pattern corresponds to a framework that defines how specific components in the target system (100) should be configured (e.g., what types of information each component should manage, what interfaces should each component expose), and how the specific components should communicate with each other (e.g., what data should be communicated to other components, etc.). Patterns are typically used to address a specific problem in a specific context (i.e., the software/system environment in which the problem arises). Said another way, patterns may correspond to a software architectural solution that incorporates best practices to solve a specific problem in a specific context.

Continuing with the discussion of FIG. 1, the query engine (10) may also be configured to issue queries about interaction of specific patterns with components that do not belong to a specific pattern. Further, the query engine (110) may be configured to issue queries about the interaction of components that do not belong to any patterns.

In one embodiment of the invention, the query engine (110) may include pre-specified queries and/or enable to the user to specify custom queries. In one embodiment of the invention, both the pre-specified queries and the custom queries are used to identify the presence of one or more patterns and/or the presence of components that do not belong to a pattern in the target system (100).

In one embodiment of the invention, the pre-specified queries and the custom queries are specified using a Pattern Query Language (PQL). In one embodiment of the invention, PQL enables the user to query the artifacts and characteristics of the artifacts stored in the characteristics store (106) to determine the presence of a specific pattern, specific components of a specific pattern, and/or other components that are not part of a pattern, within the target system (100).

In one embodiment of the invention, the query engine (110) may include information (or have access to information) about the characteristics model (108) that includes the artifact and/or characteristics being queried. Said another way, if the query engine (110) is issuing a query about a specific artifact, then the query engine (110) includes information (or has access to information) about the characteristics model to which the artifact belongs. Those skilled in the art will appreciate that the query engine (110) only requires information about the particular characteristics model (108) to the extent the information is required to issue the query to the characteristics store (106).

Those skilled in the art will appreciate that the query engine (110) may include functionality to translate PQL queries (i.e., queries written in PQL) into queries written in a query language understood by the characteristics store (106) (e.g., SQL). Thus, a query written in PQL may be translated into an SQL query prior to being issued to the characteristics store (106). In this manner, the user only needs to understand the artifacts and/or characteristics that the user wishes to search for and how to express the particular search using PQL. The user does not need to be concerned with how the PQL query is handled by the characteristics store (106).

Further, in one or more embodiments of the invention, PQL queries may be embedded in a programming language such as Java™, Groovy, or any other programming language capable of embedding PQL queries. Thus, a user may embed one or more PQL queries into a program written in one of the aforementioned programming languages. Upon execution, the program issues one or more PQL queries embedded within the program and subsequently receives and processes the results prior to displaying them to the user. Those skilled in the art will appreciate that the processing of the results is performed using functionality of the programming language in which the PQL queries are embedded.

In one embodiment of the invention, the results of the individual PQL queries may be displayed using the visualization engine (112). In one embodiment of the invention, the visualization engine (112) is configured to output the results of the queries on a display device (i.e., monitor, printer, projector, etc.).

As discussed above, each characteristics model defines one or more artifacts, one or more relationships between the artifacts, and one or more characteristics for each artifact. In one embodiment of the invention, the characteristics model corresponds to a formal specification of a domain. The following is an example of a Java™ characteristics model that is formal specification of a Java™ language domain in accordance with one embodiment of the invention.

Java ™ Characteristics Model

```
1  persistent class JFactDatabase {
2  long id primary key;
3  String version;
4  String name;
5  String sourceFile;
6  references JPackage packages(0,n) inverse factDatabase(1,1);
7  } // class JFactDatabase
8
9  persistent class JPackage {
10 long id primary key;
11 String version;
12 String name;
13 String shortName;
14 references JPackage packages (0,n) inverse parentPackage(1,1);
15 references JClass classes (0,n) inverse parentPackage(1,1);
16 } // class JPackage
17
18 persistent class JClass {
19 long id primary key;
20 String version;
21 String name;
22 String shortName;
23 Boolean isStatic;
24 Boolean isFinal;
25 Boolean isInner;
26 String accessibility;
27 String sourceFile;
28 Integer filePosition;
29 references JClass implementsInterfaces(0,n) inverse
      implementingClasses(0,n);
30 references JClass extendsClass(0,1) inverse extendingClasses(0,n);
31 references JClass contains(0,n) inverse containingClass(1,1);
32 references JMethod methods(0,n) inverse parentClass(1,1);
33 references JField fields(0,n) inverse parentClass(1,1);
34 references JAnnotation annotations(0,n) inverse parentClass(1,1);
35 } // class JClass
36
37 persistent class JMethod {
38 long id primary key;
39 String version;
40 String name;
41 String shortName;
42 Boolean isAbstract;
43 Boolean isConstructor;
44 Boolean isStatic;
45 Boolean isFinal;
46 Integer numParams;
47 String accessibility;
48 Integer filePosition;
49 references JClass returnType(1,1) inverse returnedBy(0,n);
50 references JClass throwsExceptions(0,n) inverse thrownBy(0,n);
51 references JClass catchesExceptions(0,n) inverse caughtBy(0,n);
52 references JClass instantiates(0,n) inverse instantiatedBy(0,n);
53 references JMethod calls(0,n) inverse callers(0,n);
54 references JParameter parameters(0,n) inverse method(1,1);
55 references JField usedFields(0,n) inverse usedByMethods(0,n);
56 references JAnnotation annotations(0,n) inverse parentMethod(1,1);
```

-continued

Java™ Characteristics Model

```
57  } // class JMethod
58
59  persistent class JField {
60      long id primary key;
61      String version;
62      String name;
63      String shortName;
64      Boolean isStatic;
65      Boolean isFinal;
66      String accessibility;
67      Integer filePosition;
68      references JClass type(1,1) inverse typeFields(0,n);
69      references JAnnotation annotations(0,n) inverse parentField(1,1);
70  } // class JField
71
72  persistent class JParameter {
73      long id primary key;
74      String version;
75      String name;
76      String shortName;
77      Integer index;
78      references JClass type(1,1) inverse typeParameters(0,n);
79      references JAnnotation annotations(0,n) inverse parentParameter(1,1);
80  } // class JParameter
81
```

In the above Java™ characteristics model, the JFactDatabase artifact is defined in lines 1-7, the JPackage artifact is defined in lines 9-16, the JClass artifact is defined in lines 18-35, the JMethod artifact is defined in lines 37-57, the JField artifact is defined in lines 59-70, and the JParameter artifact is defined in lines 72-80. A graphical representation of the Java™ characteristics model described above is shown in FIG. 2. Specifically, FIG. 2 shows each of the aforementioned Java™ characteristics model attributes (i.e., JFactDatabase, JPackage, JClass, JField, JParameter, and JMethod) as well as the characteristics associated with each of the aforementioned artifacts and the relationships between the aforementioned artifacts. In particular, box (130) corresponds to the JFactDatabase artifact, box (132) corresponds to the JPackage artifact, box (134) corresponds to the JClass artifact, box (136) corresponds to the JField artifact, box (138) corresponds to the JParameter artifact, and box (140) corresponds to the JMethod artifact.

Figure 3:
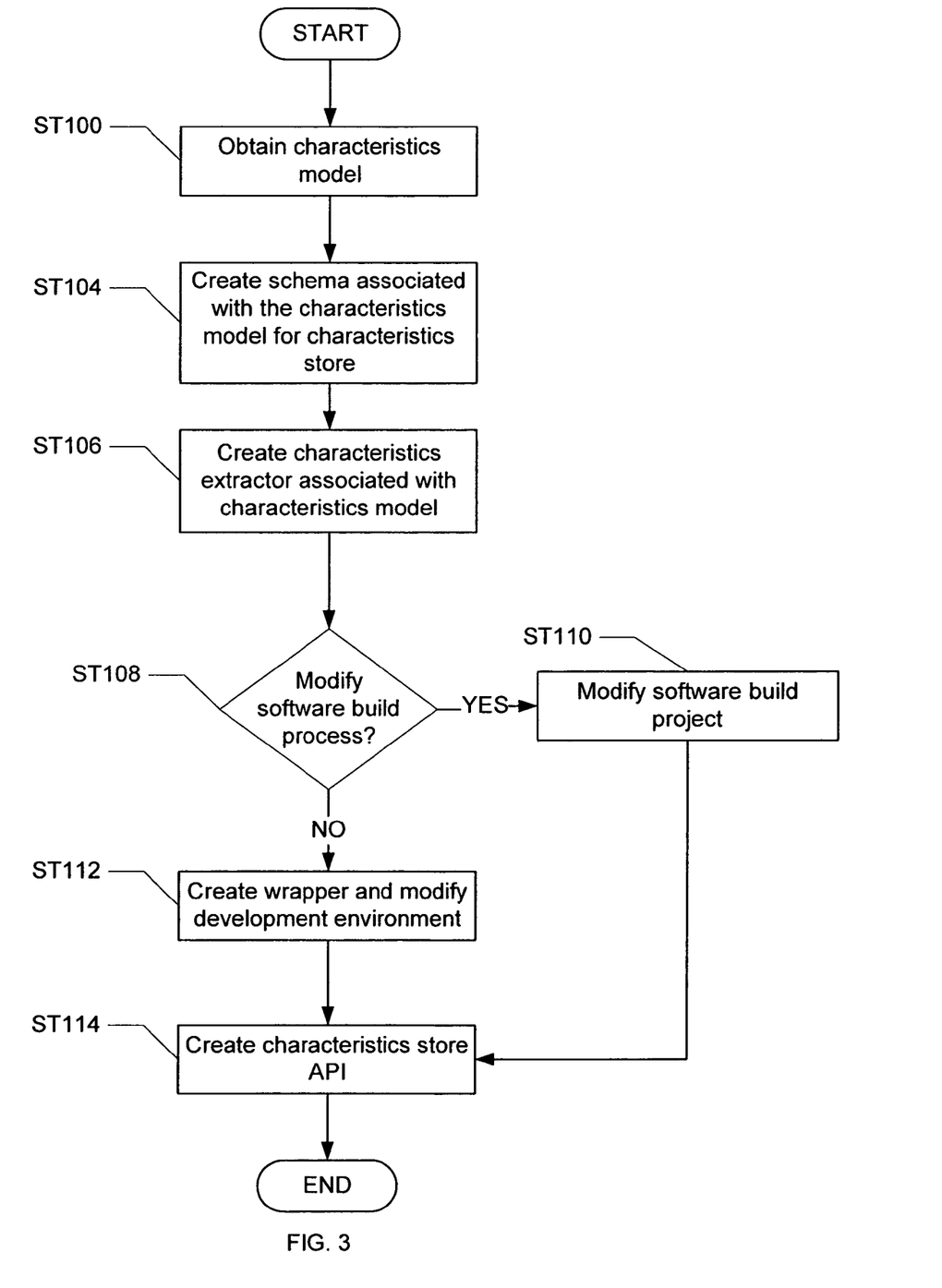
FIG. 3 shows a flowchart in accordance with one embodiment of the invention.

FIG. 3 shows a flowchart in accordance with one embodiment of the invention. Initially, a characteristics model is obtained (ST100). In one embodiment of the invention, the characteristics model is obtained from a pre-defined set of characteristics models. Alternatively, the characteristics model is customized characteristics model to analyze a specific domain in the target system and obtained from a source specified by the user.

Continuing with the discussion of FIG. 3, a schema for the characteristics store is subsequently created and associated with characteristics model (ST102). One or more characteristics extractors associated with characteristics model is subsequently created (ST104).

At this stage, a determination about whether the software build project is to be modified is made (ST108). The determination of whether the software build project is to be modified depends of the implementation of the invention. In one implementation, the software build project is modified and the development environment (discussed below) remains unchanged. Alternatively, the software build project may remain unchanged and the development environment is modified.

If the software build project is to be modified, then the appropriate process proceeds to modify the software build project (ST110). In one embodiment of the invention, modifying the software build project includes inserting a call the appropriate characteristics extractor (or set of characteristics extractors) at specific places within the software build project. In one embodiment of the invention, the specific places within the software build file correspond to calls to the compiler. Thus, prior to every call to the compiler, a call to the appropriate characteristics extractor (or set of characteristics extractors) is inserted. Once the software build project has been modified, the process proceeds to ST114 (discussed below). Those skilled in the art will appreciate that calls to invoke one or more characteristics extractors may be inserted other locations within the software build project. Further, those skilled in the art will appreciate that modifying the software build project, as discussed above, may be performed automatically by, for example, a script.

Alternatively, if the software build project is to remain unchanged, then a wrapper (i.e., a program) is created and the development environment (i.e., the software environment upon which the software build project is to be executed) is modified to call the wrapper every time a call is made to the compiler (ST122). Alternatively, the wrapper may be modified to intercept all calls made to the compiler. Those skilled in the art will appreciate that the development environment may be modified such that calls to invoke other functions (i.e., functions other than calls to the compiler) may also be intercepted by the wrapper or may result in a call to the wrapper.

Figure 4:
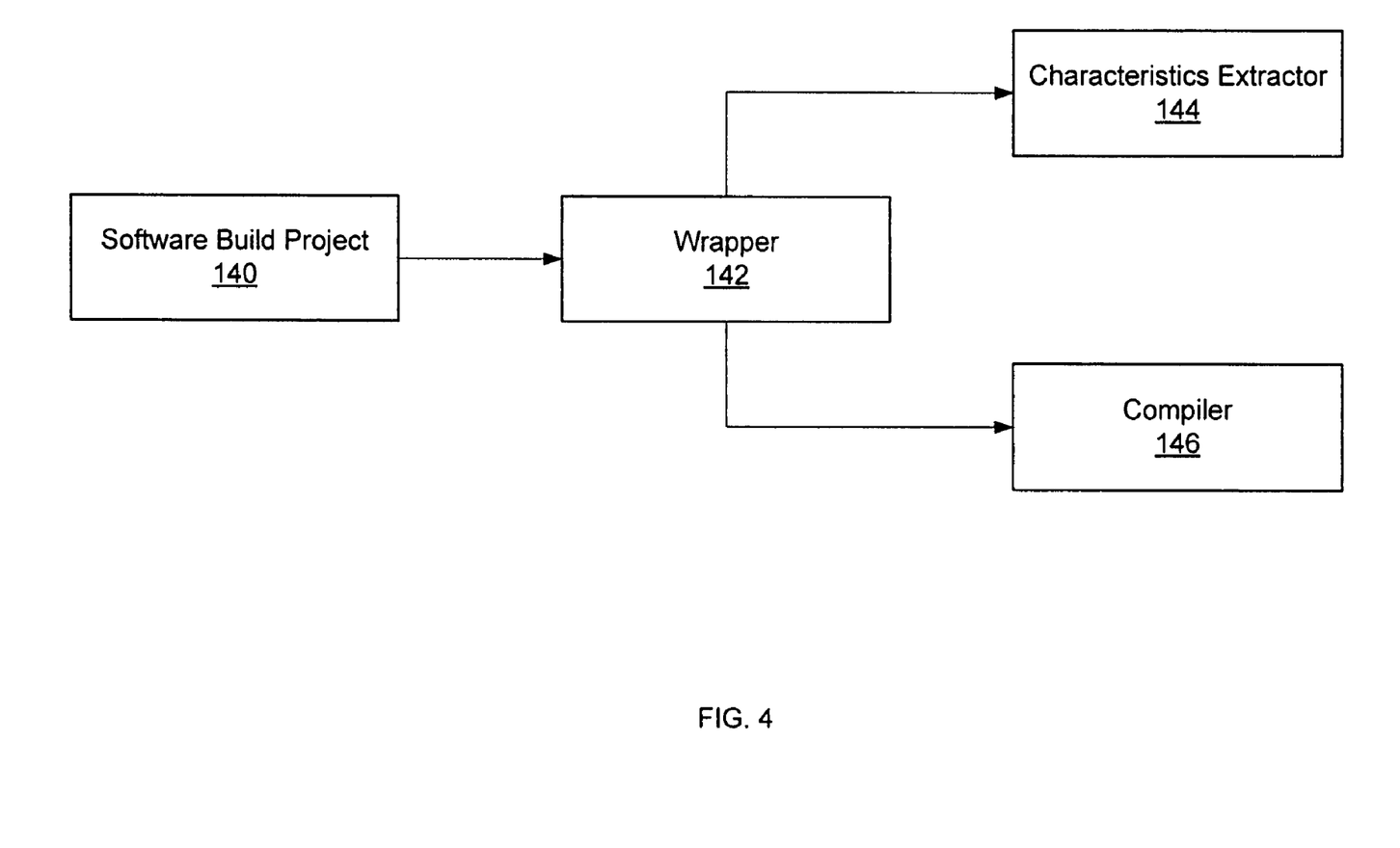
FIG. 4 shows a modified development environment in accordance with one embodiment of the invention.

FIG. 4 shows a modified development environment in accordance with one embodiment of the invention. With respect to FIG. 4, when a call to the compiler (146) is made, via the software build project (140), in the modified development environment, the modified development environment passes the call to the wrapper (142). At this stage, the compiler (146) has not been invoked as the call to the compiler (146) from the software build project (140) has not been forwarded to the compiler (146). Upon receiving the call, the wrapper (142) proceeds to extract information about the specific source files (e.g., files that contains portions of source code used by the software build project to generate the target system) that are to be compiled (along with any other relevant information to be used by the characteristics extractor(s) (144)) and forwards this information to the appropriate characteristics extractor(s) (144). The wrapper (142) then forwards the original call (i.e., the call passed to the wrapper (142)) to the compiler (146). Those skilled in the art will appreciate that wrapper (142) may forward information to the characteristics extractor (144) and the compiler (146) in any order or simultaneously. Further, the timeframe between forwarding the information extracted from the call to the characteristics extractor (144) and forwarding the call to the compiler (146) may vary with each implementation of the invention. Those skilled in the art will appreciate that wrapper and the modification of the development environment may be generated automatically.

Returning to the discussion of FIG. 3, finally, a characteristics store API is created (ST114). In one embodiment of the invention, creating the characteristics store API includes creating a mapping between characteristics obtained by the characteristics extractors and tables defined by the schema configured to store the characteristics in the characteristics store.

In addition, those skilled in the art will appreciate that once a characteristics store API is created, the characteristics store API may only need to be modified to support additional schemas in the characteristics data store and additional characteristics extractors. Alternatively, each characteristics model may be associated with a different characteristics store API.

Those skilled in the art will appreciate that by either modifying the software build project or creating a wrapper and modifying the development environment to call the wrapper every time a call is made to the compiler, the characteristics extractors may be transparently invoked without requiring the user to create an additional file to perform characteristics extraction. Further, embodiments of the invention enable a user to obtain characteristics about a complex software system without requiring any specific knowledge about the complex software system; rather, the user can rely on embodiments of the invention and the software build project to aid in the characteristics extraction and be confident that characteristics from all portions of the complex software system have been obtained.

Figure 5:
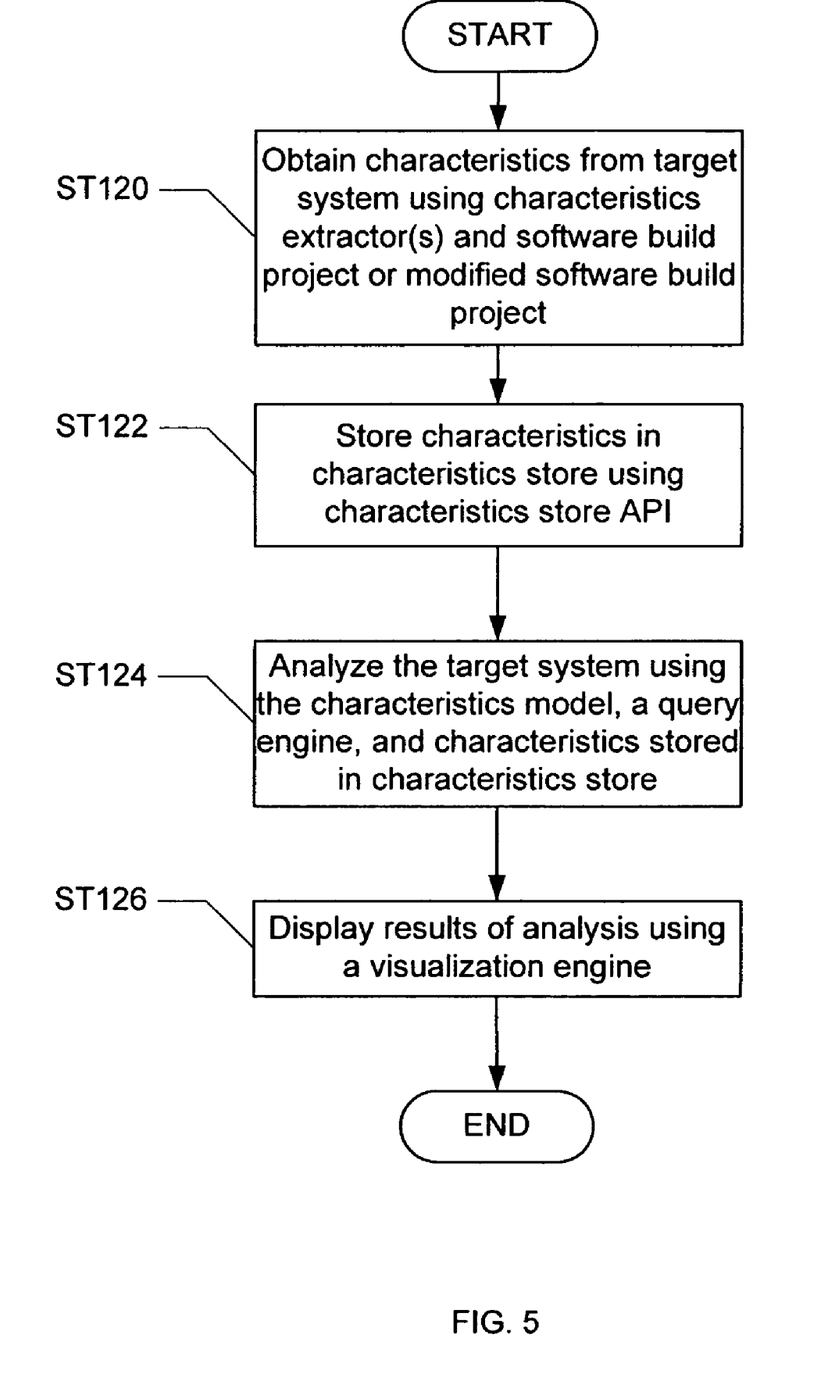
FIG. 5 shows a flowchart in accordance with one embodiment of the invention.

At this stage, the system is ready to analyze a target system. FIG. 5 shows a flowchart in accordance with one embodiment of the invention. Initially, characteristics are obtained from the target system using one or more characteristics extractors and the software build project (or modified software build project) (ST120). In one embodiment of the invention, the extraction of the characteristics from the target system is performed transparently when the software build project (or modified software build project) is executed. Thus, the user does not need to explicitly invoke the characteristics extractors to obtain characteristics from the target system; rather, the characteristics extractors are invoked when the software build project is executed. Those skilled in the art will appreciate that executing the software build project corresponds to the process of using the software build project (or modified software build project) to create the target system.

As the software build project (or modified software build project) is executed, there will be one or more calls to one or more characteristics extractors. The characteristics extractors will subsequently obtain information about the characteristics in specific portions of the target system from the source code, libraries, etc. referenced in the software build project (or modified software build project). Those skilled in the art will appreciate that the characteristics extractors associated with a given characteristics model only obtain information about characteristics associated with the artifacts defined in the characteristics model. Once the characteristics extractors, invoked during the execution of the software build project (or modified software build project), have completed extracting characteristics from various portions of the target system (e.g., source code, libraries, etc.) the method proceeds to ST122.

In ST122, the characteristics obtained from the target system using the characteristics extractors are stored in the characteristics store using the characteristics store API. Once the characteristics are stored in the characteristics store, the target system may be analyzed using the characteristics model (or models), a query engine, and the characteristics stored in the characteristics store (ST124). In one embodiment of the invention, the user uses the query engine to issue queries to characteristics store. As discussed above, the query engine may include information (or have access to information) about the characteristics models currently being used to analyze the target system. The results of the analysis are subsequently displayed using a visualization engine (ST126). Those skilled in the art will appreciate that ST120-ST122 may be performed concurrently with ST124-ST126. In addition, steps in FIG. 3, may be performed concurrently with the steps in FIG. 5.

Figure 6:
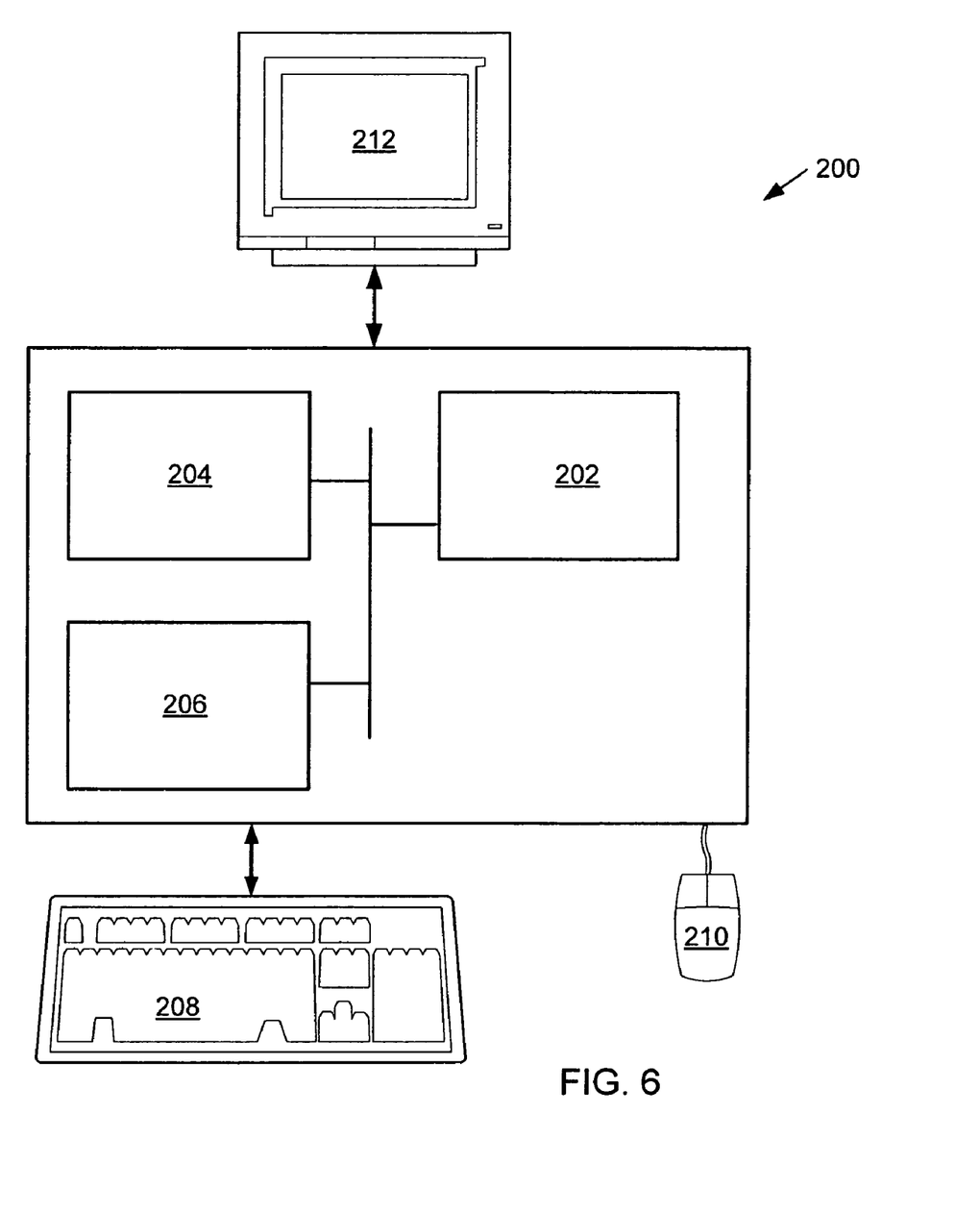
FIG. 6 shows a computer system in accordance with one embodiment of the invention.

An embodiment of the invention may be implemented on virtually any type of computer regardless of the platform being used. For example, as shown in FIG. 6, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network via a network interface connection (not shown). Those skilled in the art will appreciate that these input and output means may take other forms. Further, those skilled in the art will appreciate that one or more elements of the aforementioned computer (200) may be located at a remote location and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for analyzing a target system, comprising:
   creating a wrapper configured to call a compiler and call a characteristics extractor;
   modifying a development environment to intercept a call to the compiler and forward the call to the wrapper, wherein the call to the compiler is made during execution of a software build project;
   obtaining a plurality of characteristics from the target system using the wrapper and at least one selected from the group consisting of a software build project associated with the target system and a modified software build project associated with the target system, wherein the plurality of characteristics is associated with a characteristics model;
   storing each of the plurality of characteristics in a characteristics store; and
   analyzing the target system by issuing at least one query to the characteristics store to obtain an analysis result.

2. The method of claim 1, further comprising:
   modifying the software build project to obtain the modified software build project, prior to obtaining the plurality of characteristics from the target system.

3. The method of claim 2, wherein modifying the software build project comprises inserting a call to the characteristics extractor prior to each call to the compiler in the software build project.

4. The method of claim 1, further comprising:
   obtaining the characteristics model;
   generating the characteristics extractor associated with the characteristics model; and
   generating a characteristics store API associated with the characteristics model, wherein the characteristics extractor uses the characteristics store application programming interface (API) to store each of the plurality of characteristics in the characteristics store.

5. The method of claim 1, further comprising:
displaying the analysis result.

6. The method of claim 1, wherein the software build project is an ant build project.

7. The method of claim 1, wherein the characteristics model defines at least one artifact and at least one characteristic of the artifact.

8. The method of claim 1, wherein the characteristics model defines a first artifact, a second artifact, and a relationship between the first artifact and the second artifact.

9. The method of claim 1, wherein the at least one query is defined using a pattern query language and wherein the pattern query language includes functionality to search for at least one pattern in the target system.

10. A system comprising:
a characteristics model defining at least one artifact and a plurality of characteristics associated with the at least one artifact;
a target system comprising at least one of the plurality of characteristics defined in the characteristics model;
at least one characteristics extractor configured to obtain at least one of the plurality of characteristics from the target system at least one selected from the group consisting of a software build project associated with the target system and a modified software build project associated with the target system;
a characteristics store configured to store the at least one of the plurality of characteristics obtained from the target system;
a query engine configured to analyze the target system by issuing at least one query to the characteristics store and configured to obtain an analysis result in response to the at least one query; and
a wrapper configured to make a first call a compiler and a second call the characteristics extractor, wherein the system is modified to intercept the first call to the compiler and forward the first call to the wrapper and wherein the first call to the compiler is made during execution of the software build project.

11. The system of claim 10, wherein the modified software build project is obtained by modifying the software build project, wherein modifying the software build project comprises inserting a call to the characteristics extractor after each call to the compiler in the software build project.

12. The system of claim 10, further, comprising:
a characteristics store API, wherein the at least one characteristics extractor is configured to use the characteristics store API to store at least one of the plurality of characteristics obtained from the target system in the characteristics store.

13. The system of claim 10, further comprising:
a visualization engine configured to display the analysis result.

14. The system of claim 10, wherein that characteristics store API is associated with the characteristics model.

15. The system of claim 10, wherein the characteristics model defines at least one relationship between artifacts.

16. The system of claim 10, wherein the at least one query is defined using a pattern query language, wherein the pattern query language includes functionality to search for at least one pattern in the target system.

17. The system of claim 10, wherein the software build project is an ant build project.

18. A computer readable medium comprising software instructions for analyzing a target system, the software instructions executable on a computer to:
create a wrapper configured to call a compiler and call a characteristics extractor;
modify a development environment to intercept a call to the compiler and forward the call to the wrapper, wherein the call to the compiler is made during execution of a software build project;
obtain a plurality of characteristics from the target system using the characteristics extractor and at least one selected from the group consisting of a software build project associated with the target system and a modified software build project associated with the target system, wherein the plurality of characteristics is associated with a characteristics model;
store each of the plurality of characteristics in a characteristics store; and
analyze the target system by issuing at least one query to the characteristics store to obtain an analysis result.

19. The computer readable medium of claim 18, wherein the software instructions executable on the computer are further configured to:
obtain the characteristics model;
generate the characteristics extractor associated with the characteristics model; and
generate a characteristics store API associated with the characteristics model, wherein the characteristics extractor uses the characteristics store application programming interface (API) to store each of the plurality of characteristics in the characteristics store.

20. The computer readable medium of claim 18, wherein the software instructions executable on the computer are further configured to:
display the analysis result.

* * * * *